(12) United States Patent
Makabe et al.

(10) Patent No.: US 10,583,805 B2
(45) Date of Patent: Mar. 10, 2020

(54) VEHICLE INCLUDING CONTROLLER

(71) Applicant: Honda Motor Co., Ltd., Tokyo (JP)

(72) Inventors: Takumi Makabe, Dublin, OH (US); Dustin Lee Williams, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 757 days.

(21) Appl. No.: 15/257,514

(22) Filed: Sep. 6, 2016

(65) Prior Publication Data

US 2018/0065596 A1 Mar. 8, 2018

(51) Int. Cl.
| | |
|---|---|
| *B60R 22/48* | (2006.01) |
| *B60R 1/00* | (2006.01) |
| *B60W 30/182* | (2020.01) |
| *B60W 50/00* | (2006.01) |
| *B60W 30/188* | (2012.01) |

(52) U.S. Cl.
CPC ............... *B60R 22/48* (2013.01); *B60R 1/00* (2013.01); *B60W 30/188* (2013.01); *B60W 50/0098* (2013.01); *B60R 2022/4816* (2013.01); *B60R 2022/4866* (2013.01); *B60R 2300/50* (2013.01)

(58) Field of Classification Search
None
See application file for complete search history.

(56) References Cited

U.S. PATENT DOCUMENTS

| | | | |
|---|---|---|---|
| 4,197,919 A | 4/1980 | Redmond | |
| 4,319,658 A | 3/1982 | Collonia et al. | |
| 5,483,221 A | 1/1996 | Mutter et al. | |
| 5,547,039 A * | 8/1996 | Berger | B60R 22/48 180/287 |
| 6,260,650 B1 | 7/2001 | Gustavsson | |
| 6,278,358 B1 * | 8/2001 | Spoto | B60R 22/48 340/425.5 |
| 6,501,374 B1 | 12/2002 | King et al. | |
| 6,523,912 B1 | 2/2003 | Bond, III et al. | |
| 6,669,234 B2 * | 12/2003 | Kohlndorfer | B60R 22/03 180/268 |
| 6,728,616 B1 * | 4/2004 | Tabe | B60R 21/017 180/268 |
| 6,977,582 B2 | 12/2005 | Ota et al. | |

(Continued)

FOREIGN PATENT DOCUMENTS

WO  WO 2014/159117 A2  10/2014

*Primary Examiner* — Colby M Hansen
(74) *Attorney, Agent, or Firm* — Honda Patents & Technologies North America, LLC; Clifford B Vaterlaus (57) ABSTRACT

A vehicle includes an engine, an input device for controlling a speed of the engine, a seat for an occupant of the vehicle, a seat belt for securing the occupant in the seat, and a seat belt sensor for detecting when the seat belt is buckled. A controller may be operatively connected to the seat belt sensor and the engine for controlling the vehicle in a first mode when the seat belt is buckled and a second mode when the seat belt is unbuckled. The controller may perform various different functions, such as cutting fuel to the engine when the vehicle speed is equal to or greater than a predetermined threshold while operating in the second mode, or receiving input indicating that the input device is released before switching the vehicle to the first mode when the seat belt is buckled while the vehicle is operating in the second mode.

10 Claims, 5 Drawing Sheets

(56) References Cited

U.S. PATENT DOCUMENTS

| | | |
|---|---|---|
| 7,061,375 B2 | 6/2006 | Koike et al. |
| 7,145,447 B2 | 12/2006 | Yamanoi et al. |
| 7,145,448 B2 | 12/2006 | Tanaka et al. |
| 7,161,477 B2 | 1/2007 | Ohtomo et al. |
| 7,298,250 B2 | 11/2007 | Inoue |
| 7,469,767 B2 | 12/2008 | Jasem |
| 7,686,119 B2 | 3/2010 | Greene |
| 7,937,202 B2 | 5/2011 | Van Houten et al. |
| 8,256,560 B2 | 9/2012 | Fiske et al. |
| 8,393,428 B2 | 3/2013 | Onishi et al. |
| 8,417,421 B2 | 4/2013 | Di Lago et al. |
| 8,427,294 B2 | 4/2013 | Cheung |
| 8,464,824 B1 | 6/2013 | Reisenberger |
| 8,534,397 B2 | 9/2013 | Grajkowski |
| 8,548,710 B1 * | 10/2013 | Reisenberger ......... B60K 28/04 180/268 |
| 8,753,154 B2 | 6/2014 | Fujino et al. |
| 8,781,705 B1 | 7/2014 | Reisenberger |
| 8,818,570 B2 | 8/2014 | Johnson |
| 9,758,040 B1 | 9/2017 | Reid et al. |
| 9,889,738 B1 | 2/2018 | Reid et al. |
| 2004/0068354 A1 * | 4/2004 | Tabe ...................... B60R 22/48 701/45 |
| 2005/0012606 A1 | 1/2005 | Lee |
| 2006/0071769 A1 | 4/2006 | Ide et al. |
| 2009/0082926 A1 | 3/2009 | Klein |
| 2011/0297462 A1 | 12/2011 | Grajkowski et al. |
| 2011/0301824 A1 | 12/2011 | Nelson et al. |
| 2011/0301825 A1 | 12/2011 | Grajkowski |
| 2013/0289797 A1 | 10/2013 | Johnson et al. |
| 2014/0288763 A1 | 9/2014 | Bennett et al. |
| 2014/0379192 A1 | 12/2014 | Tanaka |
| 2015/0084763 A1 | 3/2015 | Kobayashi |
| 2015/0096819 A1 | 4/2015 | Grajkowski et al. |
| 2016/0075305 A1 | 3/2016 | Kawakatsu et al. |

* cited by examiner

VEHICLE INCLUDING CONTROLLER

TECHNICAL FIELD

The present disclosure relates generally to vehicles, and more particularly to systems and methods for controlling off-road vehicles under certain conditions.

BACKGROUND

Vehicles are conventionally provided with seat belts to help maintain occupants of the vehicles within a seating area. Off-road vehicles, such as recreational or utility vehicles or vehicles with side by side seats commonly have open seating areas surrounded by roll protection bars, nets and/or doors. In such vehicles it may be particularly advantageous for occupants to use seat belts. Accordingly, systems and methods are sought to encourage occupants of such vehicles to use seat belts while allowing the vehicles to operate in an enjoyable manner.

SUMMARY

In accordance with one embodiment, a vehicle comprises an engine, an input device for controlling a speed of the engine, a seat for an occupant of the vehicle, a seat belt for securing the occupant in the seat, and a seat belt sensor for detecting when the seat belt is buckled. A controller is operatively connected to the seat belt sensor and the engine for controlling the vehicle in a first mode when the seat belt is buckled, and a second mode when the seat belt is unbuckled. When the seat belt is buckled while the vehicle is in the second mode, the controller requires the input device to be released before switching to the first mode.

In accordance with another embodiment, a vehicle comprises an engine, a seat for an occupant of the vehicle, a seat belt for securing the occupant in the seat, a seat belt sensor for detecting when the seat belt is buckled, a display having a first indicator to indicate a vehicle speed, and a second indicator to indicate when the seat belt is not buckled. A controller is operatively connected to the seat belt sensor, the display and the engine for controlling the vehicle in a first mode when the seat belt is buckled and a second mode when the seat belt is unbuckled. In operation, the first indicator is activated to indicate the vehicle speed. When the seat belt is not buckled the second indicator is activated and the controller operates the vehicle in the second mode. If the vehicle speed is equal to or greater than a predetermined threshold, the controller cuts fuel to the engine to reduce the speed of the vehicle and causes the first indicator and the second indicator to blink.

In accordance with yet another embodiment, a vehicle comprises an engine having a throttle for controlling the speed of the engine, an input device for operation by a driver to control the throttle, a transmission having a plurality of drive gears, a seat for the driver of the vehicle, a seat belt for securing the driver in the seat, and a seat belt sensor for detecting when the seat belt is buckled. A controller is operatively connected to the seat belt sensor, the transmission and the engine for controlling the engine and the transmission in a first mode when the seat belt is buckled and a second mode when the seat belt is not buckled. The controller uses a transmission control map that indicates which of the plurality of drive gears to select based on vehicle speed and a position of the throttle. When the seat belt is not buckled and the vehicle speed is above a predetermined threshold, the controller uses a predetermined throttle position value in the transmission control map for operating the vehicle regardless of the position of the input device.

BRIEF DESCRIPTION OF THE DRAWINGS

Certain embodiments of the present disclosure will be better understood from the following description taken in conjunction with the accompanying drawings in which.

DETAILED DESCRIPTION

Figure 1:
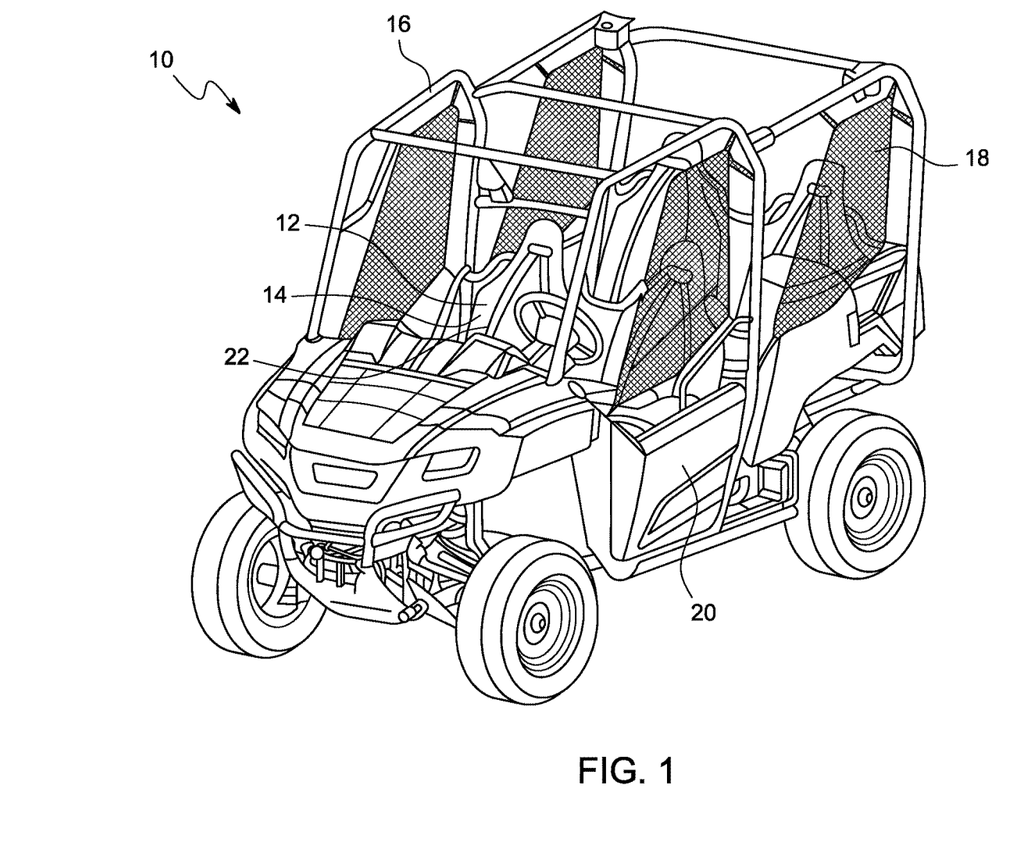
FIG. 1 is a perspective view of a vehicle in accordance with one embodiment of the present disclosure.

Embodiments are hereinafter described in detail in connection with the views and examples of FIGS. 1-5, wherein like numbers indicate the same or corresponding elements throughout the views. FIG. 1 illustrates a vehicle 10 which is shown to comprise an off-road vehicle. However, vehicles in accordance with alternative embodiments can comprise any variety of vehicles, including automobiles, trucks, vans, recreational vehicles, agricultural equipment, or construction equipment, for example.

The vehicle 10 includes one or more seats 12 for occupants of the vehicle 10. It will be appreciated that the seats 12 may be arranged in any manner and may include bench seats or bucket seats. The seats 12 may be arranged in a side by side configuration, and may be arranged in a single row or multiple rows within the scope of the present disclosure.

The vehicle 10 may include a seating area or cockpit 14 surrounded by roll bars 16, nets 18 and/or doors 20. The vehicle 10 may also include seat belts 22 in any known configuration, including lap belts, shoulder belts, multi-point restraints or harnesses. The seat belts 22 may be attached to the seat 12, the roll bars 16 or any suitable anchor point on the vehicle 10.

Figure 2:
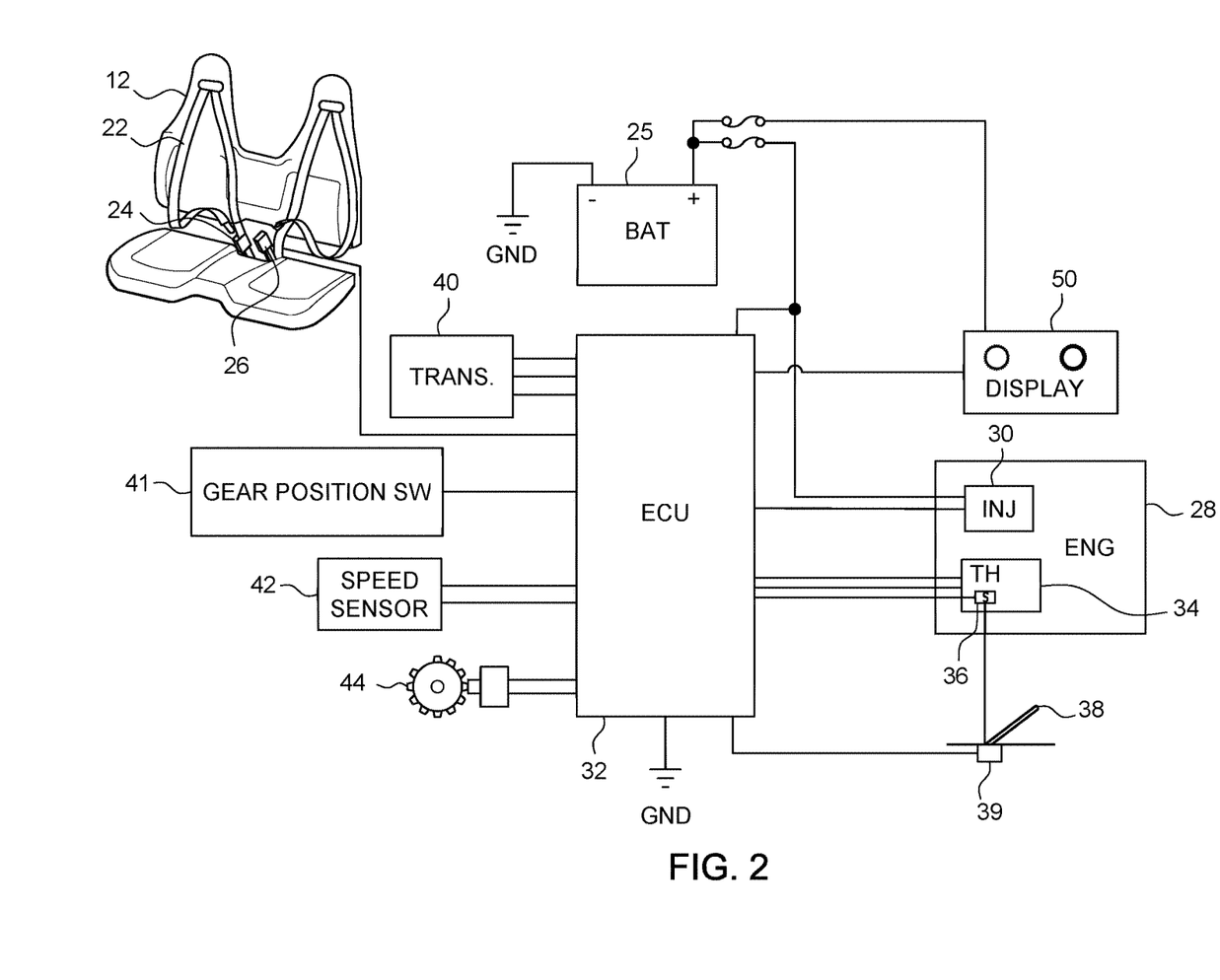
FIG. 2 is a schematic view of portions of the vehicle of FIG. 1.

Referring now to FIG. 2, which depicts a schematic view of portions of the vehicle 10 of FIG. 1, the seat belts 22 may also include a buckle 24 for receiving a tongue affixed to the belt 22 in any suitable configuration. It will be understood that the buckle 24 may be any of a variety of suitable buckles or clasps known to those skilled in the art.

The vehicle 10 may have various components electrically connected together. For example, a battery 25 may be provided as part of an electronic system shown schematically in FIG. 2. The seat belt 22 may include a sensor 26 for detecting when the seat belt 22 is buckled, for example, when opposing parts of the buckle 24 are joined. The seat belt sensor 26 may include any type of sensor know in the art, including a mechanical switch or a magnetic field sensor, for example. In one embodiment, a seat belt sensor 26 may be positioned in the buckle 24 for each seat belt 22. However, in other embodiments, a seat belt sensor 26 may be arranged for use with a single seat, such as the driver seat.

The vehicle 10 includes an engine 28 for powering the vehicle 10. The engine 28 may be an internal combustion engine of any size and configuration suitable for its intended purpose, and may be positioned in any desired location in the vehicle 10, including the front, mid or back portions of the vehicle 10. Alternatively, one embodiment of the engine 28 may include an electric motor such that the vehicle 10 may be powered by electricity.

The engine 28 may include an injector 30 for supplying fuel to be combusted in accordance with signals from a controller 32, such as an electronic control unit (ECU). The engine 28 may also include a throttle valve 34, also sometimes referred to herein as a throttle, for controlling the flow of air to the engine 28. A throttle sensor 36 may be provided to detect a position of the throttle valve 34, and an input device 38, such as an accelerator pedal, thumb throttle or accelerator grip may be provided to operate the throttle valve 34 to thereby control the speed of the engine 28. An input device sensor 39 may be provided to detect a position of the input device 38. The connection between the input device 38 and the throttle valve 34 may be mechanical such that movement of the input device 38 corresponds to movement of the throttle valve 34. Alternatively, the connection between the input device 38 and the throttle valve 34 may be accomplished electronically through a drive by wire system.

The vehicle 10 may include a transmission 40, as shown schematically in FIG. 2. The transmission 40 may be an automatic transmission having drive, neutral and reverse modes. The drive mode may have any number of drive gears, such as four to six, for example. Alternatively, it will be understood that some embodiments of the present disclosure may include a continuously variable transmission, and other embodiments may have a manual transmission with any suitable number of gears. The transmission 40 may be operatively connected to the controller 32 such that instructions for shifting between the drive gears may be controlled by the controller 32.

The vehicle 10 may include a gear position switch 41 for detecting whether the transmission 40 is in the drive, neutral, or reverse mode, or the gear in which the transmission is operating. The vehicle 10 may also include a crank pulser 44 for determining the speed of the engine 28. Use of the engine speed in combination with the drive gear, as determined at least in part by the gear position switch 41, can be used to determine the speed of the vehicle 10. Additionally, or alternatively, the vehicle 10 can include a speed sensor 42 to determine the speed of the vehicle 10. In one embodiment, use of the engine speed and gear of the vehicle 10 may be used as a primary mechanism to determine the speed of the vehicle 10. The vehicle speed sensor 42 may be used as an alternate mechanism in the event the primary speed determination mechanism fails. This may occur if the gear position is not stable or determined, or if the crank pulser 44 or gear position switch 41 fails, for example. Accordingly, the speed sensor 42 may provide a redundancy or failsafe device to make operation of the vehicle 10 more robust.

Figure 3:
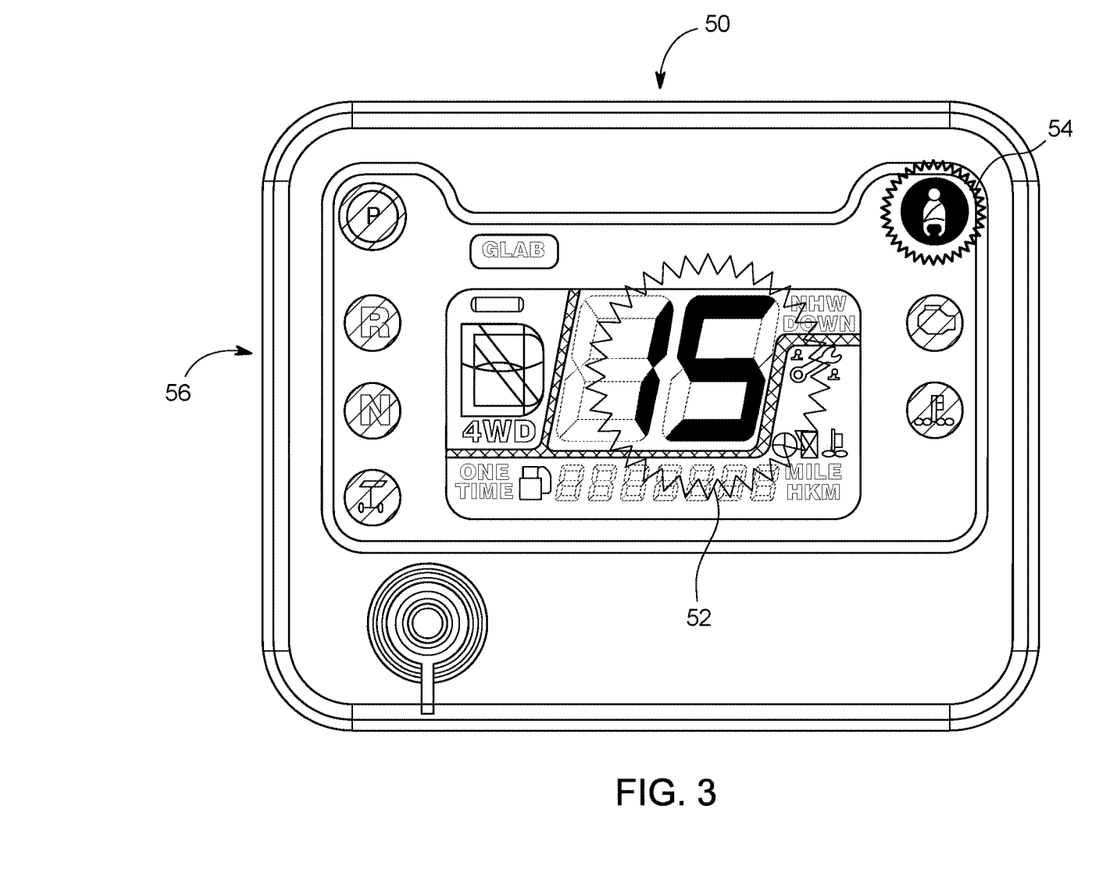
FIG. 3 is a view of one embodiment of a display useful in the vehicle of FIG. 1.

The vehicle 10 may include a display 50, such as the embodiment shown in FIG. 3, for example. The display 50 may be located on an instrument panel area of the vehicle 10 for being viewed by a driver of the vehicle 10. The display 50 may include a first indicator 52 to indicate a vehicle speed. The first indicator 52 may include a digital display of the vehicle speed as determined by the crank pulser 44 and the gear position switch 41, or as detected by the vehicle speed sensor 42. Alternatively, the first indicator 52 may include other features to indicate the vehicle speed, such as needles or electronic graphs, for example. The first indicator 52 may display the vehicle speed continuously, or in some circumstances as described more fully below, the first indicator 52 may blink on and off. The first indicator 52 may also include lighting that is continuous or blinking under certain conditions to provide an additional signal or information to the driver.

The display 50 may include a second indicator 54 to indicate when the seat belt 22 is not buckled. The seat belt 22 corresponding to the display 50 may be for a driver, a passenger or a combination of the driver and passengers. The second indicator 54 may be a depiction of a passenger wearing a seat belt or any other suitable image to convey information that the indicator is related to the seat belt 22. The second indicator 54 may include a light that turns on so that the second indicator 54 becomes visible when the seat belt sensor 26 detects that the seat belt 22 is not buckled. In certain conditions as discussed more fully below, the second indicator 54 may be on continuously when the seat belt 22 is not buckled, whereas in other circumstances, the second indicator 54 may blink. The display 50 may also have various other indicators, indicated generally at 56, to provide information to the driver such as the gear selection, mileage, fuel level, drive mode, status of engine and lights, etc.

Referring back to FIG. 2, the controller 32 may be operatively connected to the engine 28, injector 30, the seat belt sensor 26, the throttle 34, the throttle sensor 36, the input device 38, the input device sensor 39, the transmission 40, the gear position switch 41, the vehicle speed sensor 42, the crank pulser 44, the display 50, and other components to control the vehicle 10 in accordance with the principles of the present disclosure. Whereas the embodiment of the controller 32 depicted is operatively connected to multiple components, it will be understood that some of the components of the vehicle 10 may be operatively connected to separate ECU's. For example, a separate ECU may be used for the transmission 40 or an electronic power steering unit or other such devices.

Although not shown in detail in the drawings, the controller 32 or ECU may have a general configuration known to those skilled in the art, including a central processing unit (CPU), a read-only memory (ROM), a random access memory (RAM), a backup RAM, and the like, and may be connected to other components, such that necessary information or signals can be transmitted/received to/from each other in a bidirectional manner. The controller 32 may have various programs for operation control of the components as disclosed more fully below. Maps that are referred to when those programs are executed, and the like may be stored in the ROM of the controller 32.

Figure 4:
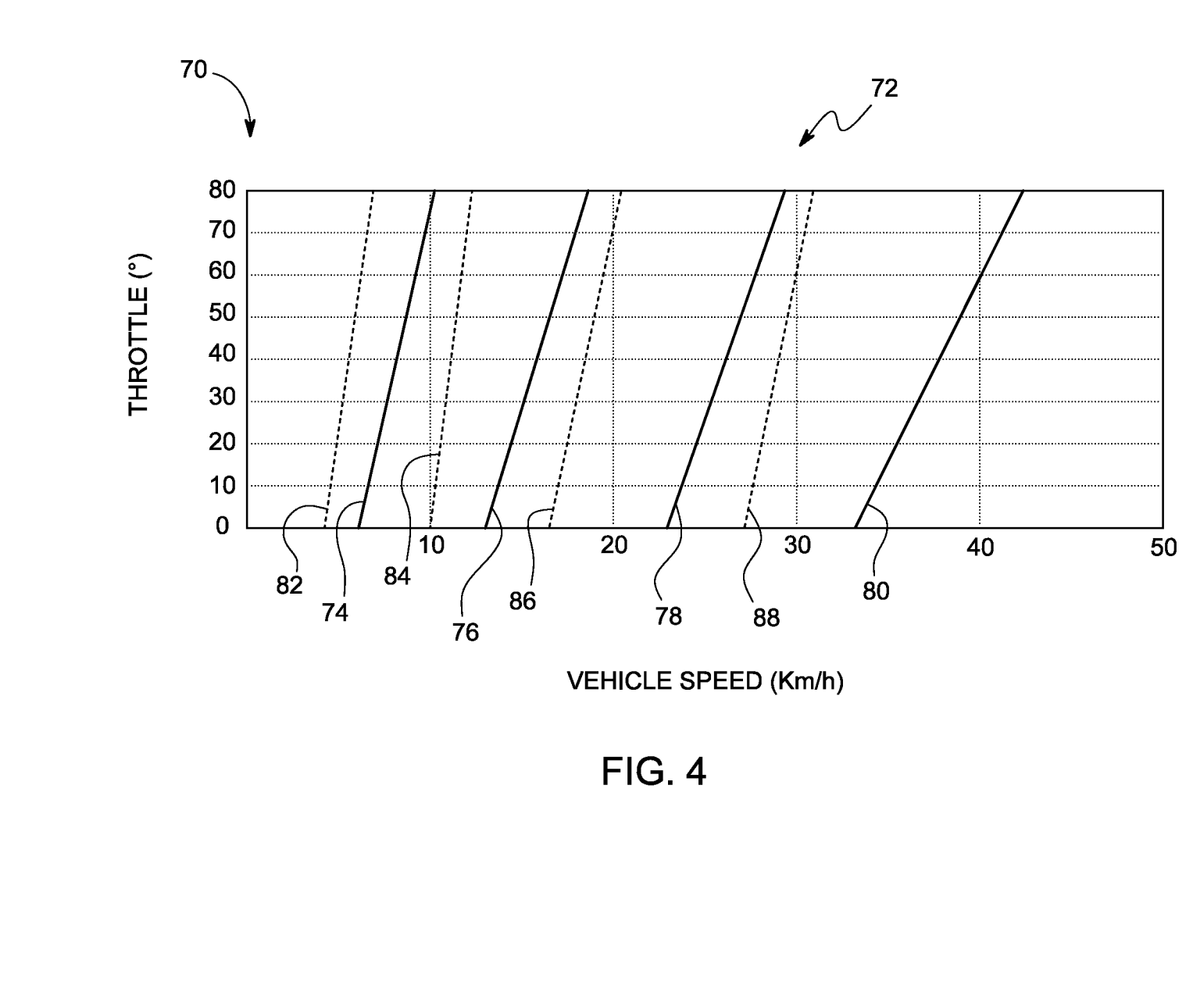
FIG. 4 is a depiction of an embodiment of a transmission control map useful in the vehicle of FIG. 1.

The controller 32 may include a transmission control map 70, an exemplary embodiment of which is shown in FIG. 4. The transmission control map 70 indicates which of the plurality of drive gears the transmission 40 is to select based on vehicle speed, shown on the horizontal axis, and a position of the throttle, shown on the vertical axis. For example, the transmission control map 70 may include a number of shift lines, indicated generally at 72, that indicate when the transmission 40 should shift from one drive gear to another. The shift lines 72 indicated in FIG. 4 include solid lines that indicate when the transmission 40 should shift from a lower gear to a higher gear, and dashed lines that indicate when the transmission 40 should shift from a higher gear to a lower gear.

As a specific example, a first shift line 74 indicates when the transmission 40 is to shift from first gear to second gear based on the vehicle speed and the throttle position in degrees. Accordingly, as the vehicle speed increases, a plot of the vehicle speed and throttle position moves from left to right on the control map 70. Once the plot reaches the first shift line 74, the transmission 40 shifts from first gear to second gear. Similarly, a second shift line 76 indicates when the transmission 40 is to shift from second gear to third gear, a third shift line 78 indicates when the transmission 40 is to shift from third gear to fourth gear, and a fourth shift line 80 indicates when the transmission 40 is to shift from fourth gear to fifth gear. Of course, more or fewer shift lines 72 could be included on the transmission control map 70 depending on the number of gears in the transmission 40.

Similarly, the shift lines 72 may include a first downshift line 82 that indicates when the transmission 40 is to downshift from second gear to first gear. A second downshift line 84 indicates when the transmission 40 is to downshift from third gear to second gear, a third downshift line 86 indicates when the transmission 40 is to downshift from fourth gear to third gear, and a fourth downshift line 88 indicates when the transmission 40 is to downshift from fifth gear to fourth gear. Again, any number of downshift lines may be incorporated into the transmission control map 70 depending on the number of gears in the transmission 40.

Figure 5:
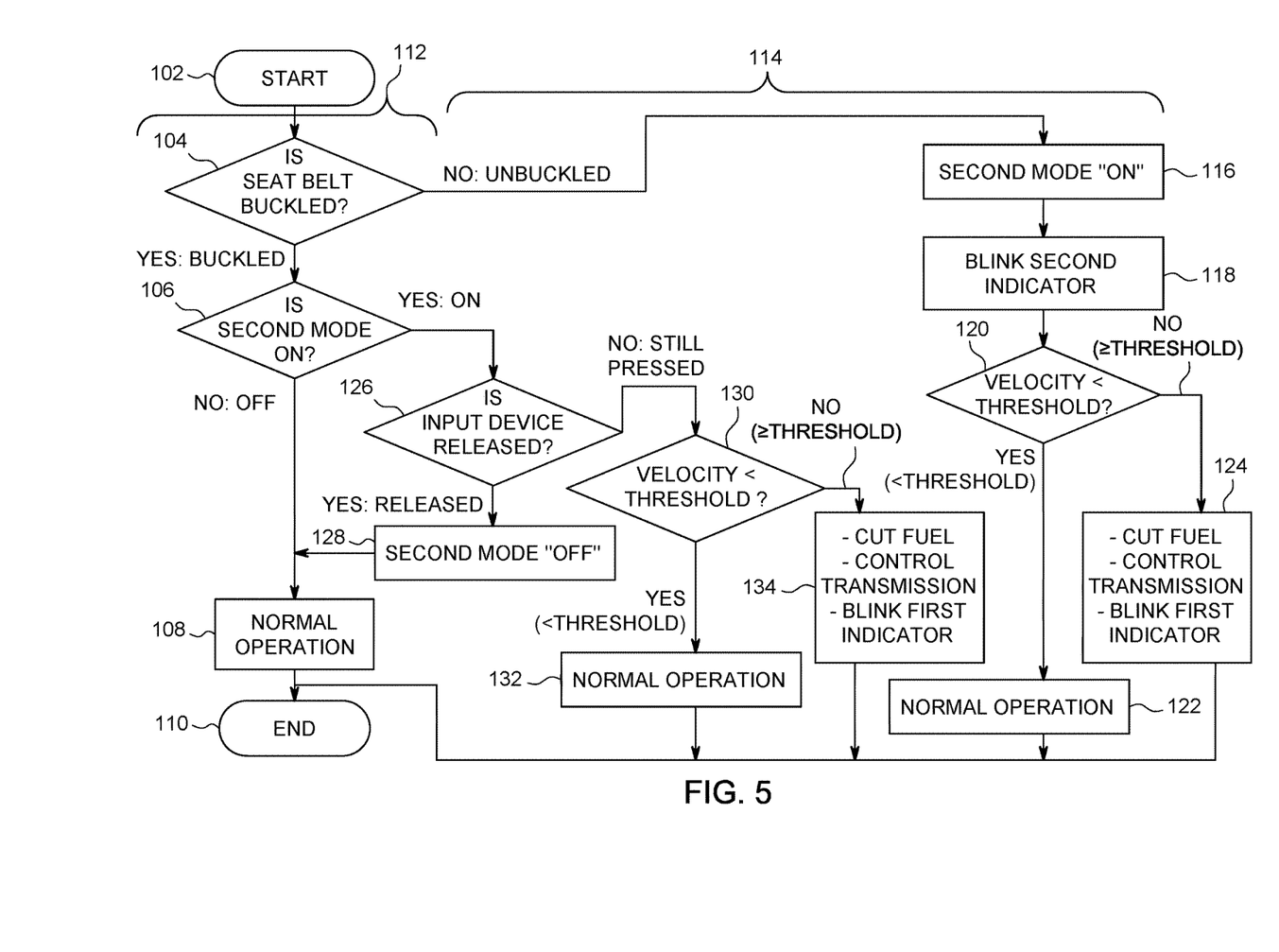
FIG. 5 is a flow chart depicting an embodiment of the operation of the vehicle of FIG. 1.

Operation of the control procedure of one embodiment of the present disclosure will now be described with reference to FIG. 5. During operation of the vehicle 10, the controller 32 may initiate a step 102 to begin the control operation. At step 104 the controller 32 receives information from a sensor to determine if an event has occurred that would warrant restriction of operation of the vehicle 10. For example, the controller 32 receives information from the seat belt sensor 26 to determine if the seat belt 22 is buckled. If the seat belt 22 is buckled the controller 32 proceeds to step 106 where the controller 32 receives information to determine if a restricted mode (or second mode 114) of the controller 32 is turned on. The restricted mode is initiated when an event has occurred that calls for a restricted operation of the vehicle 10, such as when the seat belt 22 has been unbuckled, as described more fully below. If the restricted mode is not on, the controller 32 proceeds to step 108 which provides for normal fuel injection by the fuel injector 30 and normal operation of the transmission 40 in accordance with the transmission control map 70. In other words, the fuel injector 30 and the transmission 40 operate in accordance with the input from the driver to the accelerator pedal or input device 38. The controller may then proceed to step 110 which is the end of the process.

As described above, steps 104 to 108 are included as part of a first mode 112, or normal mode, in which operation of the vehicle 10 is not restricted. A discussion of other steps of the control process in a restricted or second mode 114 will now be described.

If at step 104, the controller 32 receives information from a sensor, such as seat belt sensor 26, that an event has occurred to warrant the restricted mode 114 to be started, the controller 32 turns the restricted mode on at step 116. At step 118, the controller 32 sends a signal to the display 50 to display an indication that an event has occurred to initiate the restricted mode. For example, the second indicator 54 may be turned on to indicate that the seat belt 22 has been unbuckled. In one embodiment of the present system, the second indicator 54 may blink. However, it will be understood that the second indicator 54 may remain on without blinking to indicate that the seat belt 22 has been unbuckled.

At step 120, the controller 32 may receive information from the crank pulser 44, the gear position switch 41 and/or the speed sensor 42 to determine if the vehicle speed is less than a predetermined threshold speed, such as 15 miles per hour, for example. If the vehicle speed is less than the threshold speed, the controller 32 operates the fuel injector 30 and transmission 40 in an unrestricted manner at step 122 in accordance with input from the driver through the input device 38, such as an accelerator pedal. It will be understood that when the vehicle 10 is operated below the threshold speed, operation of the vehicle 10 need not be further restricted due to the slow speed of the vehicle 10. It will also be appreciated that alternate embodiments of the present disclosure may utilize any different suitable threshold speed.

If at step 120, the controller 32 receives information from the crank pulser 44, the gear position switch 41 and/or the speed sensor 42 that the vehicle speed is greater than or equal to the threshold speed, at step 124, the controller 32 may execute a fuel cut to the injector 30 thereby reducing the vehicle speed. At step 124, the controller 32 may also alter the transmission control. Thus, the controller 32 will control operation of the vehicle 10 in a manner that is altered as compared to the usual situation as instructed by the driver through the input device 38. In one embodiment, the controller 32 may input a predetermined throttle position value, such as 0 degrees, into the transmission control map 70, regardless of the actual position of input device 38, to thereby reduce the speed at which the vehicle 10 undergoes a downshift. This keeps the transmission 40 in a higher gear to allow the vehicle 10 to slow down gradually without abrupt reactions. For example, if the vehicle 10 is traveling at a speed greater than or equal to the threshold speed, and an occupant of the vehicle 10 unbuckles the seat belt 22, once the fuel cut is initiated at step 124, the vehicle 10 begins to slow down. To keep the deceleration at a comfortable rate, entering a throttle position value of 0 degrees into the transmission control map 70 allows a higher gear to be selected to gradually slow down the vehicle 10.

Also, in some embodiments, as part of the transmission control in step 124, the controller 32 may disregard one or more of the upshift lines in the transmission control map 70. For example, the controller 32 may prohibit upshifting to higher than third gear. In such embodiments, the controller 32 may ignore the third shift line 78 to prevent the transmission 40 from shifting from third gear to fourth gear. Similarly, the controller 32 may ignore the fourth shift line 80 to prevent the transmission 40 from shifting from fourth gear to fifth gear. Preventing shifting into higher gears will effectively limit the speed of the vehicle 10. Preventing shifting into upper gears will also prevent the vehicle 10 from increasing speed if the vehicle 10 is traveling downhill. In such situation, the transmission control map 70 would be the same as that shown in FIG. 4, except that the third shift line 78 and the fourth shift line 80 would not be present. It will be understood that the controller 32 may ignore various different shift lines 72 depending on the number of gears in the transmission 40 and the arrangement of the transmission control map 70.

One advantage of the presently disclosed system is that the transmission control map 70 may be used in multiple conditions. For example, the same transmission control map 70 can be used whether the vehicle 10 is being operated in the normal mode 112 or the restricted mode 114. Thus, multiple maps do not need to be developed and operated. It will also be understood that in some embodiments at step 124, the controller 32 may only cut the fuel without altering control of the transmission 40, and in other embodiments, the operation of the transmission 40 may be altered without altering the flow of fuel in the injectors 30.

Also at step 124, the controller 32 may send a signal to the display 50 to indicate that the threshold speed is reached or exceeded so that the driver will know why the vehicle 10 is slowing down. In one embodiment, the first indicator 52, provided as a digital speedometer, may blink in unison with the blinking of the second indicator 54, which is the seat belt indicator. This will allow the driver to understand the connection between the speed and the unbuckled seat belt 22 to know why the vehicle 10 is slowing down. Advantageously, using the first indicator 52 allows the display 50 to provide information to the driver with an indicator that is already present on the display 50 so that the display 50 does not need to be designed with additional indicators. Moreover, blinking the vehicle speed on the first indicator 52 simultaneously with the blinking of the second indicator 54 related to the buckling of the seat belt 22 makes it easy for the driver to understand the cause of restricted operation of the vehicle 10.

Once the seat belt 22 has been unbuckled, the vehicle 10 will continue to operate in the restricted mode 114 until the restricted mode 114 has been turned off. For example, if at step 104 the controller 32 determines that the seat belt 22 has been re-buckled, and at step 106 the controller 32 determines that the restricted mode 114 is on, the controller 32 receives information at step 126 from the throttle sensor 36 regarding the position of the throttle valve 34. If the input device 38 has been released for more than a predetermined amount of time, such as one second, the controller 32 turns the restricted mode 114 off at step 128. Thereafter, the process returns to the normal mode 112 and normal operation of the fuel injector 30 and transmission 40 as indicated at step 108. It will be understood that any suitable device such as a counter, timer or the like may be used to determine the amount of time the input device 38 has been released in connection with step 126.

By requiring the input device 38 to be released prior to allowing the restricted mode 114 to be turned off at step 128, the present system provides for smoother operation of the vehicle 10. For example, in the event the seat belt 22 is re-buckled while the input device 38 is pressed, the present process avoids an abrupt reaction caused by immediately resuming fuel input to the injector 30, particularly if the input device 38 is fully pressed. This condition may be common since a driver may inadvertently press the input device 38 further if the vehicle 10 starts to slow down. Once the input device 38 has been released and the restricted mode 114 has been turned off, additional manipulation of the input device 38 provides for control of the vehicle 10 in the normal manner.

If at step 126 the controller 32 determines that the input device 38 is still pressed, the controller 32 continues to step 130 where the controller 32 receives input from the crank pulser 44, the gear position switch 41 and/or the speed sensor 42 to determine if the vehicle speed is less than the threshold speed. If the vehicle speed is less than the threshold speed, the controller 32 operates the fuel injector 30 and transmission 40 in an unrestricted manner at step 132 in accordance with input from the driver through the input device 38.

If on the other hand, at step 130 the controller 32 receives input from the crank pulser 44, the gear position switch 41 and/or the speed sensor 42 and determines that the vehicle speed is greater than or equal to the threshold speed, the process proceeds to step 134. In step 134 the controller 32 causes the first indicator 52 on the display 50 to blink, the controller 32 cuts fuel to the fuel injector 30, and/or restricts operation of the transmission 40 in a manner similar to that described with regard to step 124 above. Accordingly, once the seat belt 22 has been unbuckled, the vehicle 10 will operate in the restricted mode 114 until the seat belt 22 is re-buckled and the input device 38 is released for a predetermined time as determined in step 126.

It will be understood that operation of the vehicle 10 in accordance with the principles of the present disclosure will help encourage use of the seat belt 22, and will allow the vehicle 10 to operate smoothly to enhance enjoyment of operation of the vehicle 10.

It will also be understood that the principles of the present disclosure may be used in other embodiments. For example, the procedures of the present disclosure may be used to restrict operation of the vehicle 10 in conditions where one of the doors 20 is not closed, or when a safety net 18 is not secured. More specifically, sensor 26 may be attached to the doors 20 or the safety net 18, and the controller 32 may control the throttle valve 34 or the transmission 40 as described above based on a signal from the sensor 26. Moreover, if the engine 28 is an electric motor, at step 124 the controller 32 may limit the speed of the electric motor to achieve the same effect as controlling the throttle valve 34 as described above. Similarly, various concepts of the present disclosure may be used in combination with a set of keys, such that if a particular key is used, a sensor may detect use of the key and the controller 32 may restrict operation of the vehicle 10 in some manner.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A vehicle comprising:
    an engine;
    an input device for controlling a speed of the engine, the input device comprising one of an accelerator pedal, a thumb throttle and an accelerator grip;
    a seat for an occupant of the vehicle;
    a seat belt for securing the occupant in the seat;
    a seat belt sensor for detecting when the seat belt is buckled; and
    a controller operatively connected to the seat belt sensor and the engine for controlling the vehicle in a first mode when the seat belt is buckled and a second mode when the seat belt is unbuckled, wherein when the seat belt is buckled while the vehicle is in the second mode, the controller requires a driver to release the input device before switching to the first mode.

2. The vehicle of claim 1 wherein when the vehicle is in the first mode, the controller operates the vehicle in accordance with driver input using the input device, and when the vehicle is in the second mode, the controller restricts operation of the vehicle when the vehicle speed is equal to or greater than a predetermined threshold.

3. The vehicle of claim 2 wherein the controller cuts fuel to the engine when the vehicle is in the second mode and the vehicle speed is equal to or greater than the predetermined threshold.

4. The vehicle of claim 2 further comprising a transmission having a plurality of drive gears, wherein when the vehicle is in the second mode and the vehicle speed is equal to or greater than the predetermined threshold, the controller restricts selection of one or more of the drive gears.

5. The vehicle of claim 4 wherein the controller uses a transmission control map that indicates which of the plurality of drive gears to select based on the vehicle speed and a position of a throttle, wherein when the vehicle is in the second mode and the vehicle speed is above the predetermined threshold, the controller uses a predetermined throttle position value in the transmission control map for operating the vehicle regardless of the position of the input device.

6. The vehicle of claim 1 further comprising a display having a first indicator indicating the vehicle speed, and a second indicator indicating when the seat belt is not buckled, wherein when the vehicle is in the second mode and the vehicle speed is equal to or greater than a predetermined threshold, the controller causes the first indicator and the second indicator to blink.

7. The vehicle of claim 1 wherein the controller is operably connected to a gear position sensor, an engine speed sensor and a vehicle speed sensor.

8. The vehicle of claim 7 wherein when the vehicle is in the first mode, the controller operates the vehicle in accordance with driver input using the input device, and when the vehicle is in the second mode, the controller restricts operation of the vehicle when the vehicle speed is equal to or greater than a predetermined threshold, and wherein the vehicle speed is determined using input from the gear position sensor and the engine speed sensor, and when one of the gear position sensor and the engine speed sensor fails, the controller uses the vehicle speed sensor to determine the vehicle speed.

9. The vehicle of claim 1 wherein the controller requires the input device to be released for a predetermined amount of time before switching to the first mode.

10. The vehicle of claim 1 wherein the controller uses a transmission control map that indicates which of a plurality of drive gears to select based on vehicle speed and a position of a throttle, wherein when the seat belt is not buckled and the vehicle speed is equal to or greater than a predetermined threshold, the controller ignores indication on the transmission control map to shift the transmission to a higher gear.

* * * * *